United States Patent [19]

Urban

[11] Patent Number: 4,588,050
[45] Date of Patent: May 13, 1986

[54] BRAKE SHOE ASSEMBLY

[75] Inventor: John A. Urban, Plainwell, Mich.

[73] Assignee: Eaton Corporation, Cleveland, Ohio

[21] Appl. No.: 682,626

[22] Filed: Dec. 17, 1984

[51] Int. Cl.$^4$ ............................................. F16D 69/04
[52] U.S. Cl. .................... 188/73.1; 188/242; 188/250 G
[58] Field of Search ............. 188/250 G, 250 B, 73.1, 188/71.1, 234, 242, 73.32

[56] References Cited

U.S. PATENT DOCUMENTS

| | | | |
|---|---|---|---|
| 601,651 | 4/1898 | Hall | 188/234 |
| 1,673,027 | 6/1928 | Thompson | 188/250 G X |
| 1,781,074 | 11/1930 | Norton | 188/250 G |
| 1,974,561 | 9/1934 | Cunningham | 188/250 G X |
| 2,361,307 | 10/1944 | Merritt | 188/234 |
| 2,451,326 | 10/1948 | Eksergian et al. | 188/234 |
| 2,687,191 | 8/1954 | Shannon | 188/234 |
| 3,275,105 | 9/1966 | Petit | 188/250 B |
| 3,868,002 | 2/1975 | Babled | 188/250 B X |

FOREIGN PATENT DOCUMENTS

| | | | |
|---|---|---|---|
| 1150535 | 1/1958 | France | 188/234 |
| 88926 | 3/1967 | France | 188/250 G |
| 31535 | 3/1981 | Japan | 188/73.1 |
| 2119462 | 11/1983 | United Kingdom . | |
| 2123909 | 2/1984 | United Kingdom . | |

Primary Examiner—Bruce H. Stoner, Jr.
Assistant Examiner—Michael P. Gilday
Attorney, Agent, or Firm—C. H. Grace; A. E. Chrow

[57] ABSTRACT

Disclosed is a brake shoe assembly (40) for frictionally braking a moveable member such as a wheel of a motor vehicle. Assembly (40) includes a frictional liner (8) that is removeably secured to a support member (2) that is adapted to move liner (8) towards and away from the member to be braked. Liner (8) is removeably secured to member (2) by means of at least one retainer (34) having a base portion (10) in embedded securement in liner (8) from which at least one pair of spaced-apart legs (12) extend towards support member (2) and through corresponding openings (4) therethrough to respective ends (14) thereof that are adapted to facilitate removal of liner (8) for replacement or repair.

7 Claims, 4 Drawing Figures

U.S. Patent     May 13, 1986     4,588,050
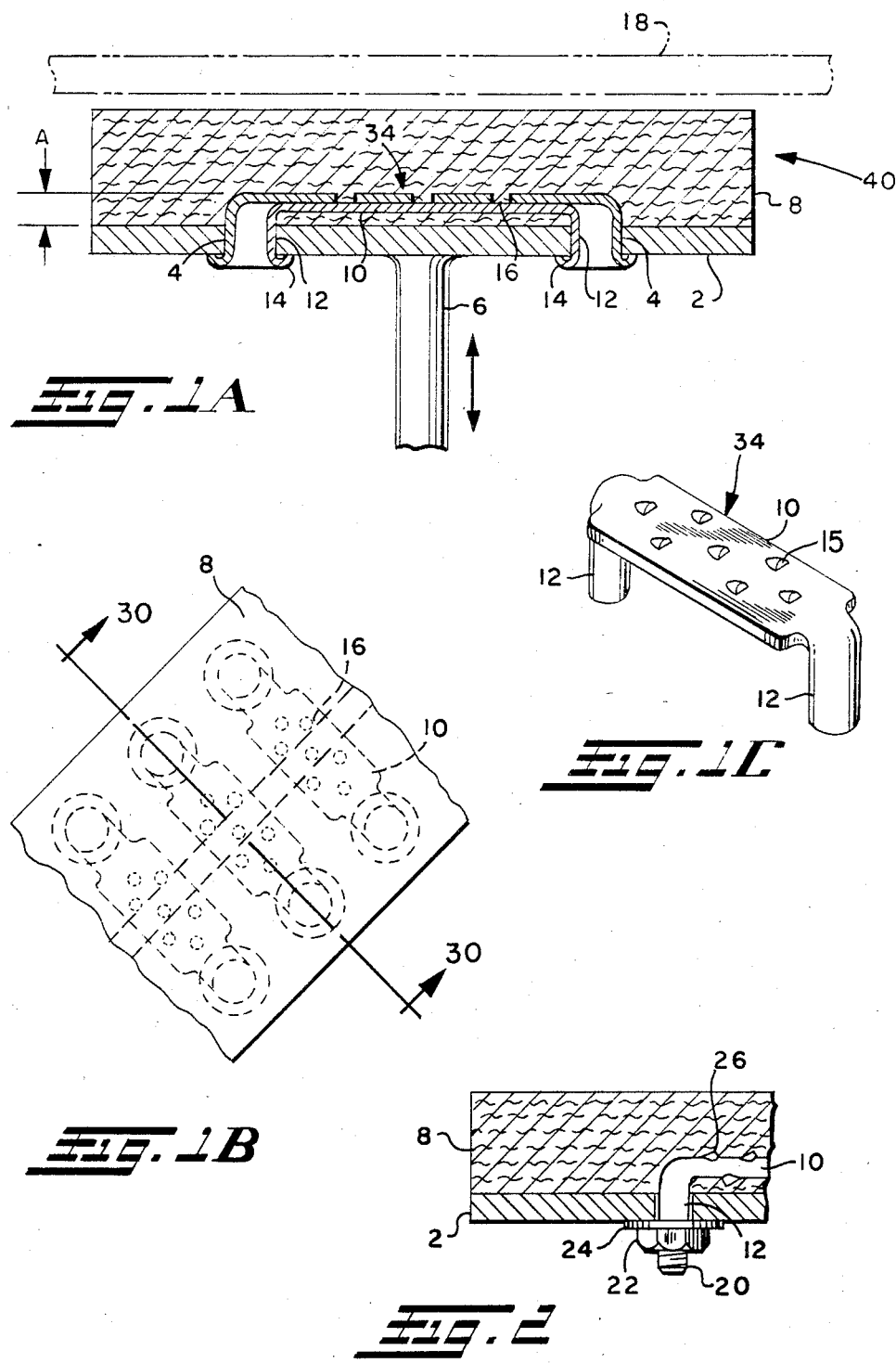

BRAKE SHOE ASSEMBLY

INTRODUCTION

This invention relates to brake shoes for frictionally braking a moveable member such as a vehicular wheel and more particularly to such shoe having a frictional lining that can be easily removed for replacement or repair.

BACKGROUND OF THE INVENTION

Brake shoes having a frictional lining for frictionally braking a moveable member such as a rotating shaft or vehicular wheel have been known for many years. Generally, such shoes feature a frictional liner secured to one side of a support member that is adapted to move towards and away from the moveable member by actuation and de-actuation of a brake peddle or arm and, in the case of braking, urge the frictional liner against the moveable member with sufficient force to enable the resultant frictional drag to slow and/or stop the moveable member from moving. Accordingly, the support member is commonly made from a suitable metal having sufficient strength to withstand the forces involved and the liner is commonly made from an abestoes or other suitable material able to produce the amount of frictional forces required as well as resist deterioration from heat ordinarily arising during frictional braking.

Since brake shoe frictional linings are subject to wear, it is extremely desirable to be able to remove them easily for replacement or repair without undue cost and expense. Heretofore however, such frictional linings have been either bonded or otherwise fixedly secured to the support member making their separation difficult if not impossible or they have included a removeable intermediate member to which the liner is bonded or otherwise fixedly secured which likewise may be difficult or impossible to separate resulting again in excessive cost and expense in having to discard both the liner and the intermediate member.

Examples of brake shoe linings that are molded directly onto the support member is disclosed for example in U.S. Pat. No. 3,275,105 and British Patent Application GB No. 2123908A and brake shoe liners that include an intermediate member between the liner and the support member are disclosed for example in U.S. Pat. No. 2,451,326 and British Patent Application GB No. 2119462A, the disclosures of which are incorporated herein by reference.

In view of the above, a need exists to provide a brake shoe that is simple in construction and enables the frictional lining to be easily replaced at minimum cost and expense.

SUMMARY OF THE INVENTION

Accordingly, it is an object of this invention to provide a brake shoe for frictionally braking a moveable member.

It is another object of this invention to provide a brake shoe that is simple in construction yet provides effective removeable securement between a support member and a frictional lining.

It is still another object of this invention to provide a low cost brake shoe and brake utilizing same that is particularly suited for use for frictional braking of vehicular wheels and which enables easy removal of the frictional lining for replacement or repair.

BRIEF DESCRIPTION OF THE DRAWINGS

FIG. 1A shows a partial cross-sectional view 30—30 of an embodiment of brake shoe 40 of the invention;

FIG. 1B shows a partial top plan view of brake shoe 40 of FIG. 1A and its association with a typical vehicular wheel braking surface;

FIG. 1C shows a perspective view of a retainer used in brake shoe 40 of FIGS. 1A and 1B; and FIG. 2 shows a partial cross-sectional view of another embodiment of a retainer that may be used in conjunction with the brake shoe of the invention.

DESCRIPTION OF SOME PREFERRED EMBODIMENTS

FIG. 1A shows an embodiment of the invention in the form of brake shoe 40. Shoe 40 comprises a support member 2 to one side of which facing moveable member 18 is removeably secured frictional lining 8. Support member 2 has a web 6 such as associated with vehicular drum brakes as is well known to those ordinarily skilled in the art. Support member 2 is moveable toward and away from member 18 in the direction of the arrows upon corresponding activation or de-activation of a brake arm or pedal by the vehicle operator. Upon activation of the brake, lining 8 is urged against moveable member 18 which, in the event it is moving at the time, is caused to slow and stop if when sufficient force is applied due to frictional forces arising from the engagement between lining 8 and member 18. Although shown in use with a drum brake in FIG. 1A, shoe 40 may of course be adapted for use with a vehicular disc brake or other braking system. Support member 2 is made from a material, preferably metal, suitable to withstand the forces involved in the braking operation.

Frictional lining 8 is made from a material such as an asbestoes composition or other suitable composition that exhibits good wear and heat resistance due to high temperatures commonly arising during the frictional braking operation. In the past, lining 8 has been permanently molded onto support member 2 making their separation difficult if not impossible as previously described.

In accordance with the invention, frictional lining 8 is removeably secured to member 2 by means of retainer 34 which has a base portion 10 and at least one pair of spaced-apart legs 12 extending away from portion 10 as shown in FIGS. 1A–1C. Retainer 34 may have any cross-sectional shape such as a hollow tube as shown in FIGS. 1A and 1B or a solid rod as shown in FIG. 1C. Retainer 34 preferably is made from a hollow tube made from a suitable material that is compatible with the material from which liner 8 is made and possesses sufficient strength to firmly secure liner 8 to member 2 and maintain the securement under the forces arising from repeated braking. Spaced-apart legs 12 extend away from base portion 10 through corresponding openings 4 in member 2 to ends 14 that are formed into rivets to firmly removeably secure liner 8 to member 2 as shown in FIG. 1A.

Alternatively, the ends of legs 12 may be threaded to provide threads 20 that are threadingly engaged with nut 22 preferably with washer 22 or the like to removeably secure liner 8 to member 2 as shown in FIG. 2.

Base portion 10 of retainer 34 is in embedded securement in liner 8 which is preferably accomplished by molding liner 8 about base portion 10 with legs 12 extending from one side thereof a distance sufficient to enable legs 12 to extend through openings 4 as previously described.

Although retainer 34 preferably has a "U" shaped configuration with base portion 10 substantially parallel to the side of member 2 facing towards moveable member 18, retainer 34 may have any configuration provided it includes a base portion and at least one pair of spaced-apart legs as previously described.

A plurality of spaced-apart retainers 34 are used to removeably secure liner 8 to member 2 as shown in FIG. 1B. Although the pattern may be uniform as shown in FIG. 1B, it is to be understood that retainers 34 may be disposed in any pattern along the length of liner 8 with their respective base portions 10 substantially the same or varying in length between legs 12.

At least a portion of base portion 10 may be flattened as shown in FIGS. 1A–1C to enhance the embedded securement of retainer 34 in liner 8 and may include one or more openings, such as openings 16 shown in FIGS. 1A and 1B and openings 15 shown in FIG. 1C through which portions of liner 8 can extend to even further enhance its embedded securement to retaining 34. Alternatively, one or more protuberances such as protuberances 26 may extend into liner 8 from base portion 10 as shown in FIG. 2 to enhance the embedded securement or retainer 34 in liner 8. Protuberances 26 may be used alone or in conjunction with openings 16 where such is desired or other suitable means may be used.

Base portion 10 of retainer 34 is embedded into liner 8 a distance "A" as shown in FIG. 1A that is deep enough to provide the degree of embedded securement desired yet shallow enough to provide a useful braking life for liner 8.

The use of retainers 34 hereinbefore described provide a simple and low cost means of removeably securing liner 8 to a support member enabling it to be easily removed for replacement or repair not only for use wth friction brakes, particularly vehicular drum and disc type brakes, but also for braking other types of moveable members such as rotating generator shafts or the like.

What is claimed is:

1. A brake shoe for frictionally braking a moveable member, said show comprising a support member adapted to be moved towards and away from the moveable member and having a frictional lining removably secured to a side thereof facing towards the moveable member that is made from a material adapted to frictionally brake the moveable member when urged thereagainst by the support member, said lining secured to the support member by at least one hollow tubular retainer having a base portion in embedded securement in the lining having at least a portion thereof flattened and having at least one pair of spaced-apart hollow tubular legs that extend in a direction towards the support member and thence through corresponding openings therethrough to respective ends thereof that are adapted to removably secure the lining to the support member to facilitate removal of the liner.

2. The brake shoe of claim 1 wherein the retainer base portion is substantially parallel to the side of the support member facing toward the moveable member.

3. The brake show of claim 1 wherein the retainer base portion is provided with means for enhancing the embedded securement thereof to the liner.

4. The brake shoe of claim 3 wherein the means for enhancing the embedded securement of the retainer base portion to the liner comprises at least one protuberance extending from the retainer base portion and embedded in the liner.

5. The brake shoe of claim 3 wherein the means for enhancing the embedded securement of the retainer base portion to the liner comprises at least one opening through the base portion adapted to enable a portion of the liner to extend therethrough.

6. The brake shoe of claim 1 wherein the ends of the legs are provided with threads and extend away from the side of the support member facing away from the moveable member for a distance sufficient to enable their respective removeable securement to the support member by a nut adapted to threadingly engage the threads.

7. The brake shoe of claim 1, wherein the means for securing the liner to the support member comprises expanding the hollow leg ends into rivets that removeably secure the liner to the support member.

* * * * *